(12) United States Patent
Brown et al.

(10) Patent No.: US 9,104,319 B2
(45) Date of Patent: *Aug. 11, 2015

(54) DATA INTEGRITY PROTECTION IN STORAGE VOLUMES

(71) Applicant: International Business Machines Corporation, Armonk, NY (US)

(72) Inventors: Theresa M. Brown, Tucson, AZ (US); Nedlaya Y. Francisco, Tucson, AZ (US); Matthew J. Kalos, Tucson, AZ (US); Suguang Li, Tucson, AZ (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/475,453

(22) Filed: Sep. 2, 2014

(65) Prior Publication Data

US 2014/0372718 A1 Dec. 18, 2014

Related U.S. Application Data

(63) Continuation of application No. 13/473,139, filed on May 16, 2012, now Pat. No. 8,874,862, which is a continuation of application No. 13/013,541, filed on Jan. 25, 2011, now Pat. No. 8,856,470.

(51) Int. Cl.
*G06F 12/00* (2006.01)
*G06F 3/06* (2006.01)
*G06F 11/14* (2006.01)
*G06F 11/20* (2006.01)

(52) U.S. Cl.
CPC .............. *G06F 3/0614* (2013.01); *G06F 3/065* (2013.01); *G06F 3/067* (2013.01); *G06F 3/0619* (2013.01); *G06F 3/0659* (2013.01); *G06F 3/0665* (2013.01); *G06F 3/0683* (2013.01); *G06F 11/1446* (2013.01); *G06F 11/2094* (2013.01); *G06F 11/1456* (2013.01); *G06F 11/2074* (2013.01)

(58) Field of Classification Search
None
See application file for complete search history.

(56) References Cited

U.S. PATENT DOCUMENTS 7,171,514 B2 1/2007 Coronado et al.
2003/0182312 A1 9/2003 Chen et al.
(Continued)

FOREIGN PATENT DOCUMENTS

CN 1619509 5/2005

OTHER PUBLICATIONS

Preliminary Amendment, dated Jan. 25, 2011, for U.S. Appl. No. 13/013,541, filed Jan. 25, 2011, entitled, "Data Integrity Protection in Storage Volumes", invented by Theresa Brown et al., pp. 1-11.
(Continued)

*Primary Examiner* — Brian Peugh
(74) *Attorney, Agent, or Firm* — Rabindranath Dutta; Konrad, Raynes, Davda and Victor LLP

(57) ABSTRACT

A plurality of logical volumes are stored at a plurality of sites. A command to execute an operation on a logical volume is received. A determination is made as to whether a rule associated with the logical volume permits execution of the operation on the logical volume. In response to determining that the rule associated with the logical volume permits execution of the operation on the logical volume, the operation is executed on the logical volume.

18 Claims, 8 Drawing Sheets

(56) References Cited

U.S. PATENT DOCUMENTS

| | | |
|---|---|---|
| 2004/0260870 A1 | 12/2004 | Factor et al. |
| 2005/0114591 A1 | 5/2005 | Coronado et al. |
| 2005/0228961 A1 | 10/2005 | Reuter et al. |
| 2008/0022062 A1 | 1/2008 | Nagahori et al. |
| 2008/0256314 A1 | 10/2008 | Anand et al. |
| 2009/0204777 A1 | 8/2009 | Norman |
| 2009/0228645 A1 | 9/2009 | Kitamura |
| 2009/0240705 A1 | 9/2009 | Miloushev et al. |
| 2009/0276774 A1 | 11/2009 | Kinoshita |
| 2010/0057985 A1 | 3/2010 | Kaneda et al. |
| 2012/0191930 A1 | 7/2012 | Brown et al. |
| 2012/0233422 A1 | 9/2012 | Brown et al. |

OTHER PUBLICATIONS

Preliminary Amendment, dated May 16, 2012, for U.S. Appl. No. 13/013,541, filed Jan. 25, 2011, entitled, "Data Integrity Protection in Storage Volumes", invented by Theresa Brown et al., pp. 1-6.

Office Action. dated Apr. 24, 2013, for U.S. Appl. No. 13/013,541, filed Jan. 25, 2011, entitled, "Data Integrity Protection in Storage Volumes", invented by Theresa Brown et al., pp. 1-43.

Response to Office Action, dated Jul. 24, 2013, for U.S. Appl. No. 13/013,541, filed Jan. 25, 2011, entitled, "Data Integrity Protection in Storage Volumes", invented by Theresa Brown et al., pp. 1-10.

Final Office Action. dated Sep. 25, 2013, for U.S. Appl. No. 13/013,541, filed Jan. 25, 2011, entitled, "Data Integrity Protection in Storage Volumes", invented by Theresa Brown et al., pp. 1-41.

Response to Final Office Action, dated Dec. 26, 2013, for U.S. Appl. No. 13/013,541, filed Jan. 25, 2011, entitled, "Data Integrity Protection in Storage Volumes", invented by Theresa Brown et al., pp. 1-10.

Office Action, dated Jan. 16, 2014, for U.S. Appl. No. 13/013,541, filed Jan. 25, 2011, entitled, "Data Integrity Protection in Storage Volumes", invented by Theresa Brown et al., pp. 1-12.

Response to Office Action, dated Apr. 15, 2014, for U.S. Appl. No. 13/013,541, filed Jan. 25, 2011, entitled, "Data Integrity Protection in Storage Volumes", invented by Theresa Brown et al., pp. 1-11.

Supplemental Amendment, dated May 2, 2014, for U.S. Appl. No. 13/013,541, filed Jan. 25, 2011, entitled, "Data Integrity Protection in Storage Volumes", invented by Theresa Brown et al., pp. 1-10.

Notice of Allowance, dated May 30, 2014, for U.S. Appl. No. 13/013,541, filed Jan. 25, 2011, entitled, "Data Integrity Protection in Storage Volumes", invented by Theresa Brown et al., pp. 1-11.

Preliminary Amendment, dated May 16, 2012, for U.S. Appl. No. 13/473,139, filed May 16, 2012, entitled, "Data Integrity Protection in Storage Volumes", invented by Theresa Brown et al., pp. 1-16.

Office Action dated Apr. 19, 2013, for U.S. Appl. No. 13/473,139, filed May 16, 2012, entitled, "Data Integrity Protection in Storage Volumes", invented by Theresa Brown et al., pp. 1-36.

Response to Office Action, dated Jul. 19, 2013, for U.S. Appl. No. 13/473,139, filed May 16, 2012, entitled, "Data Integrity Protection in Storage Volumes", invented by Theresa Brown et al., pp. 1-8.

Final Office Action, dated Sep. 30, 2013, for U.S. Appl. No. 13/473,139, filed May 16, 2012, entitled, "Data Integrity Protection in Storage Volumes", invented by Theresa Brown et al., pp. 1-35.

Response to Final Office Action dated Dec. 26, 2013, for U.S. Appl. No. 13/473,139. filed May 16, 2012, entitled, "Data Integrity Protection in Storage Volumes", invented by Theresa Brown et al., pp. 1-9.

Office Action, dated Jan. 16, 2014, for U.S. Appl. No. 13/473,139. filed May 16, 2012, entitled, "Data Integrity Protection in Storage Volumes", invented by Theresa Brown et al., pp. 1-12.

Response to Office Action, dated Apr. 15, 2014, for U.S. Appl. No. 13/473,139. filed May 16, 2012, entitled, "Data Integrity Protection in Storage Volumes", invented by Theresa Brown et al., pp. 1-8.

Supplemental Amendment, dated May 2, 2014, or U.S. Appl. No. 13/473,139. filed May 16, 2012, entitled, "Data Integrity Protection in Storage Volumes", invented by Theresa Brown et al., pp. 1-8.

Notice of Allowance, dated Jun. 24, 2014, or U.S. Appl. No. 13/473,139. filed May 16, 2012, entitled, "Data Integrity Protection in Storage Volumes", invented by Theresa Brown et al., pp. 1-15.

International Search Report and Written Opinion dated May 31, 2012 for International Application No. PCT/IB2012/050107 filed Jan. 10, 2012 , pp. 1-11.

Response dated Feb. 9, 2015, pp. 2, to Office Action, dated Nov. 7, 2014, for U.S. Appl. No. 14/505,186, filed Oct. 2, 2014, invented by Theresa M. Brown et al., Total 12 pages.

US Patent Application, dated Oct. 2, 2014, for U.S. Appl. No. 14/505,186, filed Oct. 2, 2014, invented by Theresa M. Brown et al., Total 30 pages.

Office Action, dated Nov. 7, 2014, for U.S. Appl. No. 14/505,186, filed Oct. 2, 2014, invented by Theresa M. Brown et al., Total 12 pages.

Machine Translation for CN1619509, published May 25, 2005, Total 23 pages.

Information Materials for IDS, dated Apr. 21, 2015, Total 4 pages.

Patent 7,171,514 is an English counterpart to CN1619509.

Publication 2005/0114591 is an English counterpart to CN1619509.

Notice of Allowance, dated Apr. 2, 2015, for U.S. Appl. No. 14/505,186 (22.148C3), filed Oct. 2, 2014, invented by Theresa M. Brown et al., Total 16 pages.

DATA INTEGRITY PROTECTION IN STORAGE VOLUMES

CROSS-REFERENCE TO RELATED APPLICATION

This application is a continuation of U.S. patent application Ser. No. 13/473,139, filed May 16, 2012, wherein U.S. patent application Ser. No. 13/473,139 is a continuation of U.S. patent application Ser. No. 13/013,541, filed Jan. 25, 2011, the disclosure of each of which is hereby incorporated herein by reference in its entirety.

BACKGROUND

1. Field

The disclosure relates to a method, a system, and a computer program product for data integrity protection in storage volumes.

2. Background

A plurality of sites may be coupled together via one or more networks, wherein each of the plurality of sites may have one or more storage controllers that store data in storage volumes. Some of the sites may be separated by extended distances, such as distances exceeding a thousand kilometer, whereas certain other sites may be relatively proximate to each other. Data replication, i.e., copying of data, may be performed over extended distances between two or more sites for business continuity and disaster recovery. In certain mechanisms, data may be replicated synchronously or asynchronously. Additionally, in certain mechanisms, consistency groups of volumes may be formed at regular intervals in order to allow recovery of data.

The copy services functions performed in the plurality of sites may include many types of operations. For example, point in time copy operations may make it possible to create copies of entire logical volumes or data, nearly instantaneously. Peer to Peer Remote Copy or PPRC operations may make it possible to replicate a storage volume to another control unit in a remote site, either synchronously or asynchronously. In certain computing environments a plurality of storage volumes may be simultaneously copied from a primary site to a recovery site, while maintaining point in time consistency across the plurality of storage volumes.

SUMMARY OF THE PREFERRED EMBODIMENTS

Provided are a method, a system, and a computer program product in which a plurality of logical volumes are stored at a plurality of sites. A command to execute an operation on a logical volume is received. A determination is made as to whether a rule associated with the logical volume permits execution of the operation on the logical volume. In response to determining that the rule associated with the logical volume permits execution of the operation on the logical volume, the operation is executed on the logical volume.

In additional embodiments, in response to determining that the rule associated with the logical volume does not permit execution of the operation on the logical volume, the execution of the operation on the logical volume is avoided.

In further embodiments, a determination is made as to whether a parameter of the command indicates that the rule associated with the logical volume is to be overridden by the command. In response to determining that the rule associated with the logical volume is to be overridden by the command, the operation on the logical volume is executed.

In yet further embodiments, the rule associated with the logical volume restricts a copy operation to be performed on the logical volume to overwrite the logical volume if the logical volume stores a consistent copy of another logical volume. Additionally, a label associated with the logical volume identifies the logical volume.

In certain embodiments, the logical volume is a first logical volume that is in a consistent copy service relationship with a second logical volume. The command is a withdraw command that requests withdrawal of at least the first or the second logical volume from the consistent copy service relationship. The withdraw command is rejected in response to interpreting rules associated with the first or the second logical volume.

In further embodiments, prior to receiving the command to execute the operation on the logical volume, a volume label for the logical volume is set, and the rule is associated with the volume label.

In certain embodiments, the logical volume is in a copy service relationship with another logical volume.

In additional embodiments, the logical volume is configured to perform migration of data or disaster recovery.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Associating Rules with Storage Volumes

Mechanisms are provided for maintaining data integrity in storage volumes that may have been replicated, i.e., copied, across a plurality of sites. Volume labels and rules are associated with storage volumes to place restrictions on operations that may be performed on the storage volumes. For example, if point in time copy operations have been used to consistently copy a first set of volumes to a second set of volumes, and the second set of volumes are expected to be used for data recovery, then the second set of volumes may be restricted from being overwritten via rules that are associated with the second set of volumes. As a result, erroneous commands that attempt to overwrite the second set of volumes may be rejected. The rules associated with the volumes may also restrict or permit other types of operations. Additionally, labels may be associated with the volumes to indicate the identity of the storage volume and to indicate whether the storage volume has original data, copied data, etc.

Exemplary Embodiments

Figure 1:
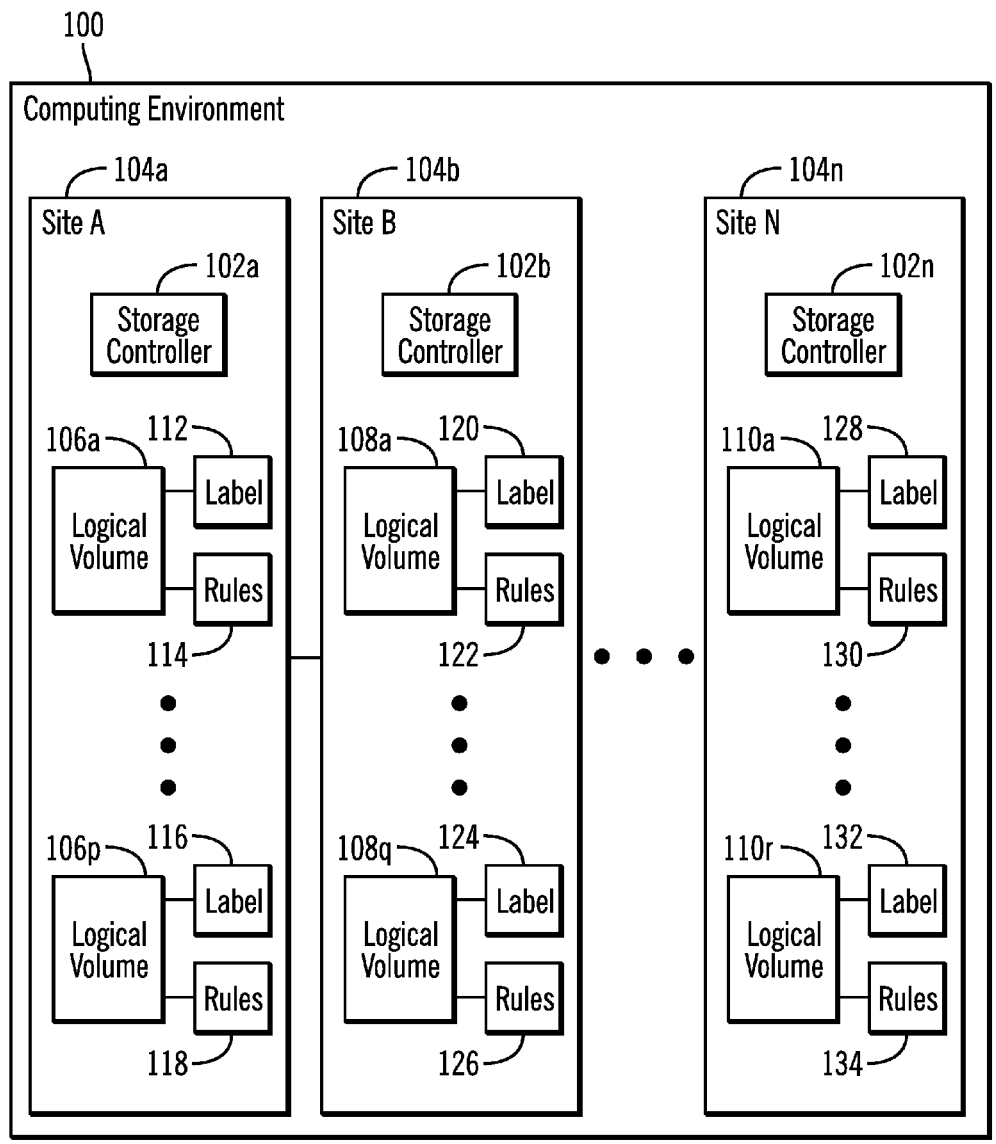
FIG. 1 illustrates a block diagram of a computing environment that includes a plurality of storage controllers controlling a plurality of logical volumes at a plurality of sites, in accordance with certain embodiments.

FIG. 1 illustrates a block diagram of a computing environment 100 that has a plurality of storage controllers 102a, 102b, . . . , 102n that are located in a plurality of sites 104a, 104b, . . . , 104n. The plurality of sites 104a . . . 104n may be separated by extended distances, such as distances of over a thousand kilometer, or may be more proximate. For example, two sites may be in the same office complex in a first continent, whereas a third site may be in a second continent. The storage controllers 102a . . . 102n may be any suitable computational device including those presently known in the art, such as, a personal computer, a workstation, a server, a mainframe, a hand held computer, a palm top computer, a telephony device, a network appliance, a blade computer, a storage server, a storage controller, etc. In certain embodiments, the storage controllers 102a . . . 102n may comprise cloud component parts included in a cloud computing environment.

The plurality of sites 104a . . . 104n are coupled via a network, such as the Internet, or via some other type of network, such as a storage area network, a local area network, a wide area network, etc. While a single storage controller has been shown in each site, in alternative embodiments a plurality of storage controllers may be present in each site.

A storage controller may control a plurality of logical volumes, wherein a logical volume is a logical representation of a physical storage volume that is used for storing data. For example, the storage controller 102a may control the logical volumes 106a . . . 106p, the storage controller 102b may control the logical volumes 108a . . . 108q, and the storage controller 102n may control the logical volumes 110a . . . 110r.

In certain embodiments, a label and one or more rules are associated with each logical volume. For example, the label 112 and the one or more rules 114 are associated with the logical volume 106a. Other labels 116, 120, 124, 128, 132 and rules 118, 122, 126, 130, 134 that are associated with other logical volumes are also shown in FIG. 1. The labels 116, 120, 124, 128, 132 may also be referred to a volume labels or logical volume labels.

The labels 112, 116, 120, 124, 128, 132 may provide information that identifies the logical volume. For example, label 128 associated with logical volume 110a may indicate that the name of the logical volume 110a is "C".

The rules 114, 118, 122, 126, 130, 134 may indicate restrictions associated with selected logical volumes, wherein in certain embodiments the restrictions may indicate operations that may or may not be performed on selected logical volumes. For example, the rules 130 associated with logical volume 110a may indicate that the logical volume 110a may not be the target of another point in time copy operation. If the logical volume 110a already stores data copied via a previous point in time copy operation, then performing another point in time copy operation with the logical volume 110a as the target volume may overwrite the previously stored data that may have to be used in the future for data restoration. Therefore, the rules 130 may restrict the logical volume 110a from being overwritten.

Therefore, FIG. 1 illustrates certain embodiments in which labels and rules are associated with logical volumes, to provide constraints on the operations that may be performed on the logical volumes.

Figure 2:
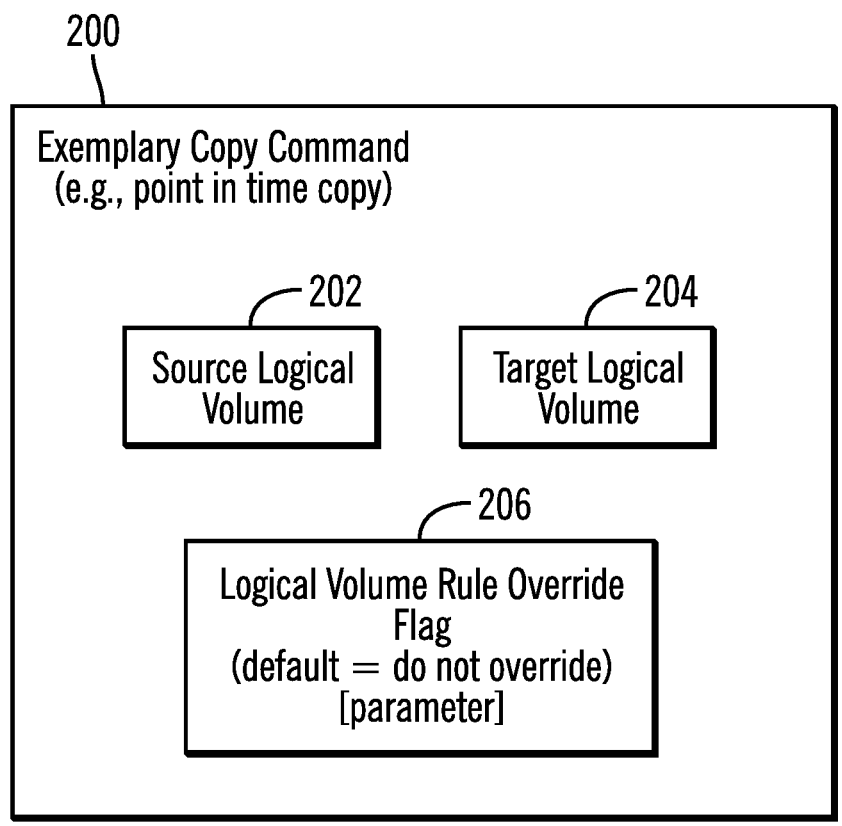
FIG. 2 illustrates a block diagram that shows an exemplary copy command, in accordance with certain embodiments.

FIG. 2 illustrates an exemplary command 200, such as a point in time copy command 200 that may be executed in the computing environment 100. The point in time copy command 200 may have parameters comprising a source logical volume 202, a target logical volume 204, and a logical volume rule override flag 206. The point in time copy command 200 is a command to copy a source target volume to the target logical volume. However, if the logical volume rule override flag 206 is set to a default value of "false", then when the point in time copy command 200 is executed the rules associated with the source logical volume 202 and the target logical volume 204 are also processed to determine whether the point in time copy command will actually copy the source logical volume 202 to the target logical volume 204. For example, if the rules associated with the target logical volume 204 indicate that the target logical volume 204 cannot be the target of any further point in time copy operations, then the point in time copy command 200 will not execute to overwrite the target logical volume 204.

In certain embodiments, if a user sets the logical volume rule override flag 206 to "true" to indicate that rules associated with logical volumes should be overridden, then the point in time copy command 200 is executed to copy the source logical volume 202 to the target logical volume 204 irrespective of any restrictions placed by rules associated with the source logical volume 202 or the target logical volume 204.

Therefore, FIG. 2 illustrates certain embodiments in which commands on logical volumes are executed in the computing environment 100 by taking account of rules associated with logical volumes, in response to setting a logical volume rule override flag to a default value of "false". If the logical volume rule override flag is set to "true" then the rules associated with logical volumes do not restrict the operation of the commands executed with the logical volumes as parameters.

Figure 3:
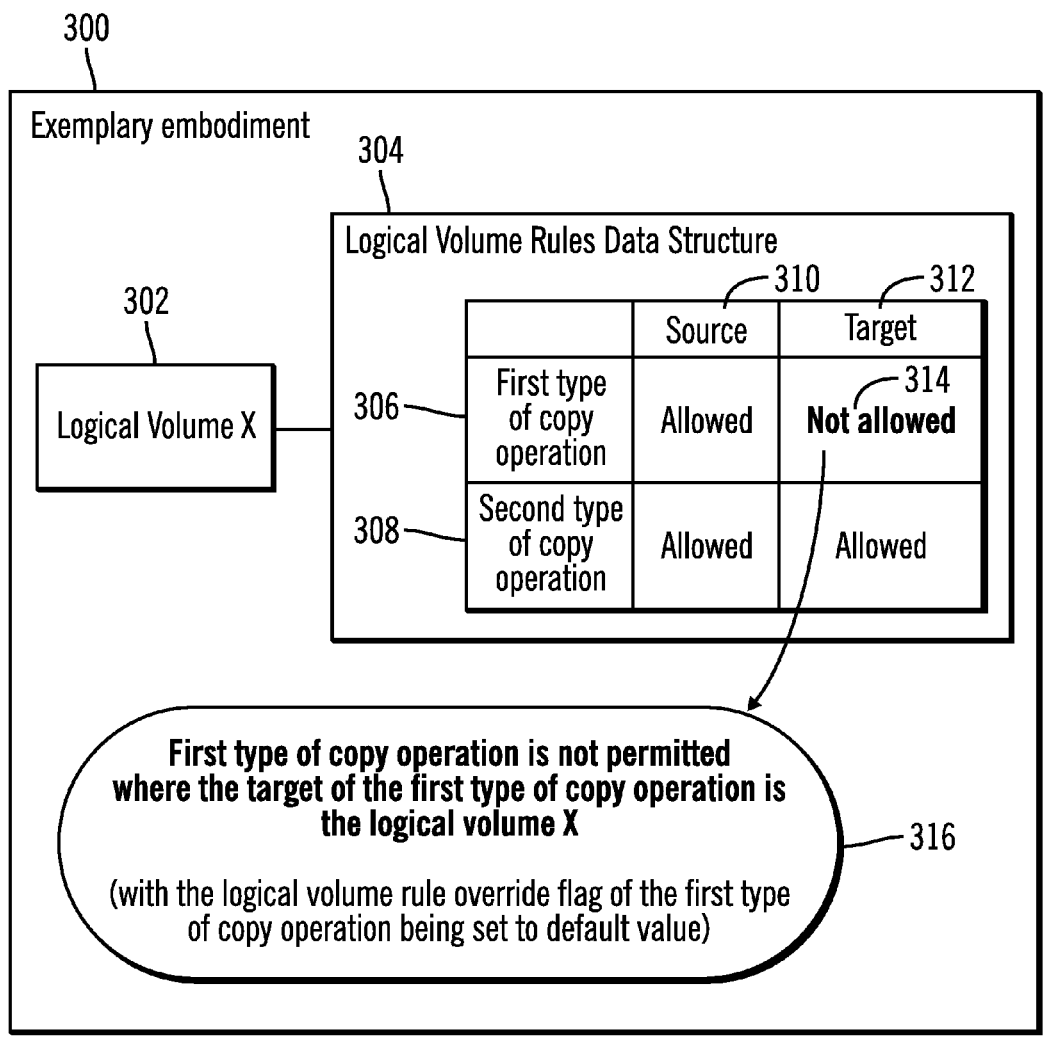
FIG. 3 illustrates a block diagram that shows a rules data structure associated with a logical volume, in accordance with certain embodiments.

FIG. 3 illustrates an exemplary embodiment 300 that shows how the rules associated with a logical volume X 302 are maintained in a logical volume rules data structure 304. In an exemplary logical volume rules data structure 304, for a first type of copy operation 306, and a second type of copy operation 308, it is indicated whether it is possible for the logical volume X 302 to be a source 310 or a target 312 volume. For example, the "not allowed" indication 314 in the logical volume rules data structure 304 may be interpreted to indicate (as shown via reference numeral 316) that the first type of copy operation 306 is not permitted where the target of the first type of copy operation is the logical volume X 302, when the logical volume rule override flag of the first type of copy operation is set to the default value of "false".

Figure 4:
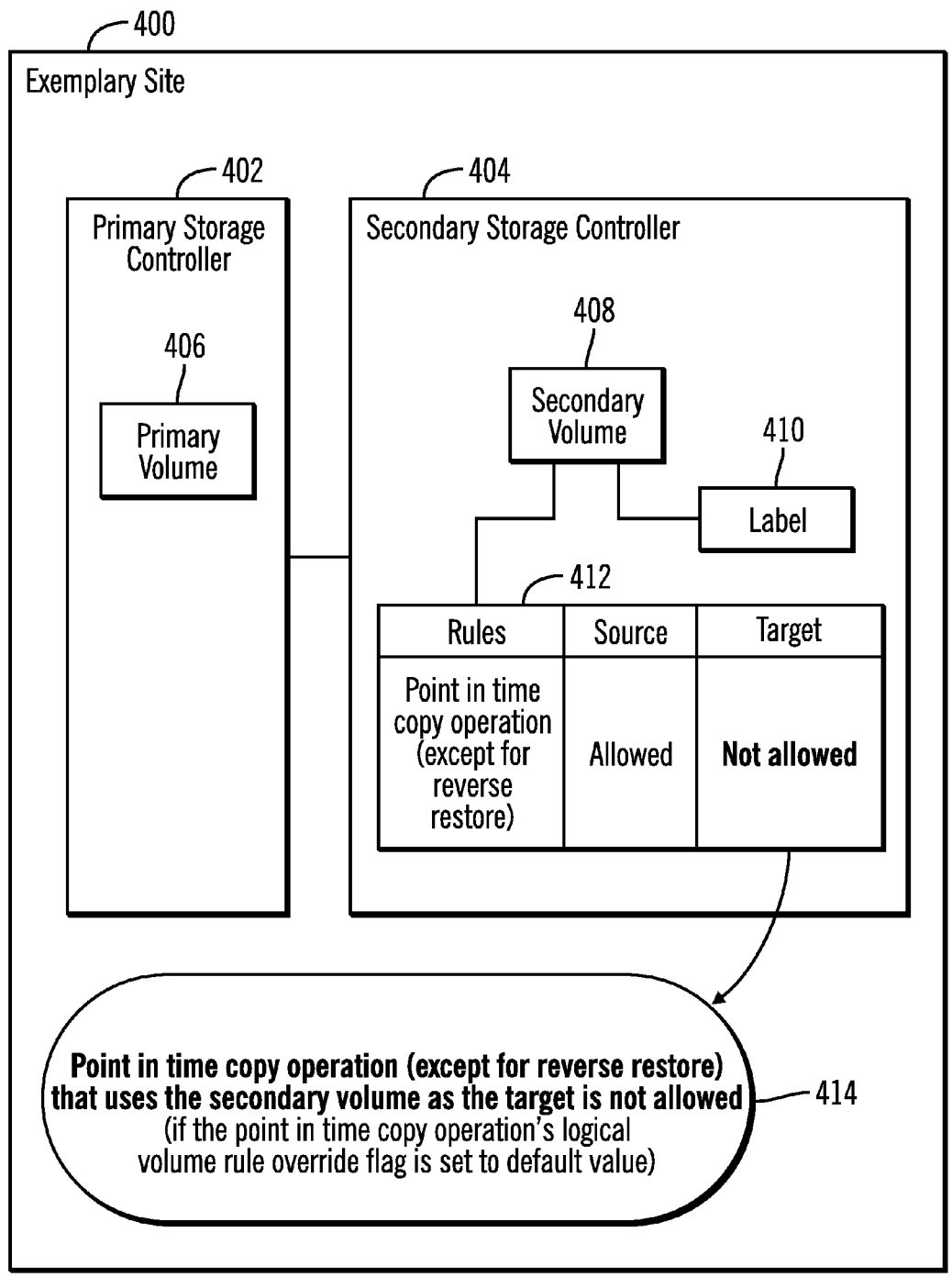
FIG. 4 illustrates a block diagram that shows how a secondary volume is restricted from being used as the target of a subsequent point in time copy operation, in accordance with certain embodiments.

FIG. 4 illustrates an exemplary site 400 that has a primary storage controller 402 and a secondary storage controller 404, wherein a primary volume 406 in the primary storage controller 402 has been consistently copied to the secondary volume 408 in the secondary storage controller 406. In certain embodiments, the label 410 associated with the secondary volume 408 may indicate the identity of the secondary volume, and the rules 412 associated with the secondary volume

408 may indicate that the point in time copy operation that uses the secondary volume 408 as the target is not allowed (shown via reference numeral 414), except in the case of reverse restore operations, or if the point in time copy operation's logical volume rule override flag is not set to the default value of "false".

Therefore, FIG. 4 illustrates certain embodiments in which point in time copy operations are restricted from using as the target those volumes that already store consistently copied data.

Figure 5:
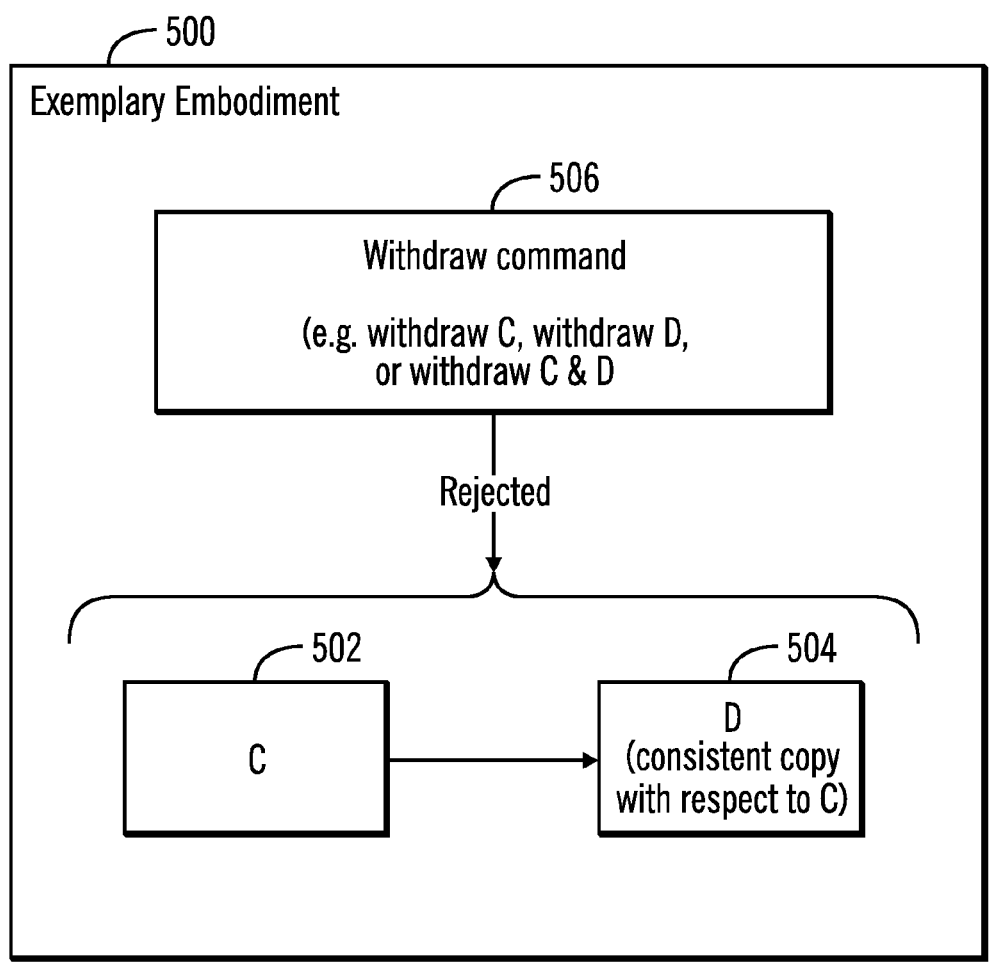
FIG. 5 illustrates a block diagram that shows how a withdraw command is rejected, in accordance with certain embodiments.

FIG. 5 illustrates an exemplary embodiment 500 in which logical volumes C 502 and D 604 are in a consistent copy relationship. If a withdraw command 506 that requests withdrawal of logical volume C, logical volume D, or both logical volumes C and D, is initiated in the computing environment 100, then the withdraw command 506 is rejected based on at least the rules associated with the logical volumes C 502 and D 504.

Therefore, FIG. 5 illustrates certain embodiments in which withdraw commands cannot be used to break a consistent copy relationship between two logical volumes, unless the logical volume rule override flag in the withdraw commands are set to override the rules and labels associated with the two logical volumes.

Figure 6:
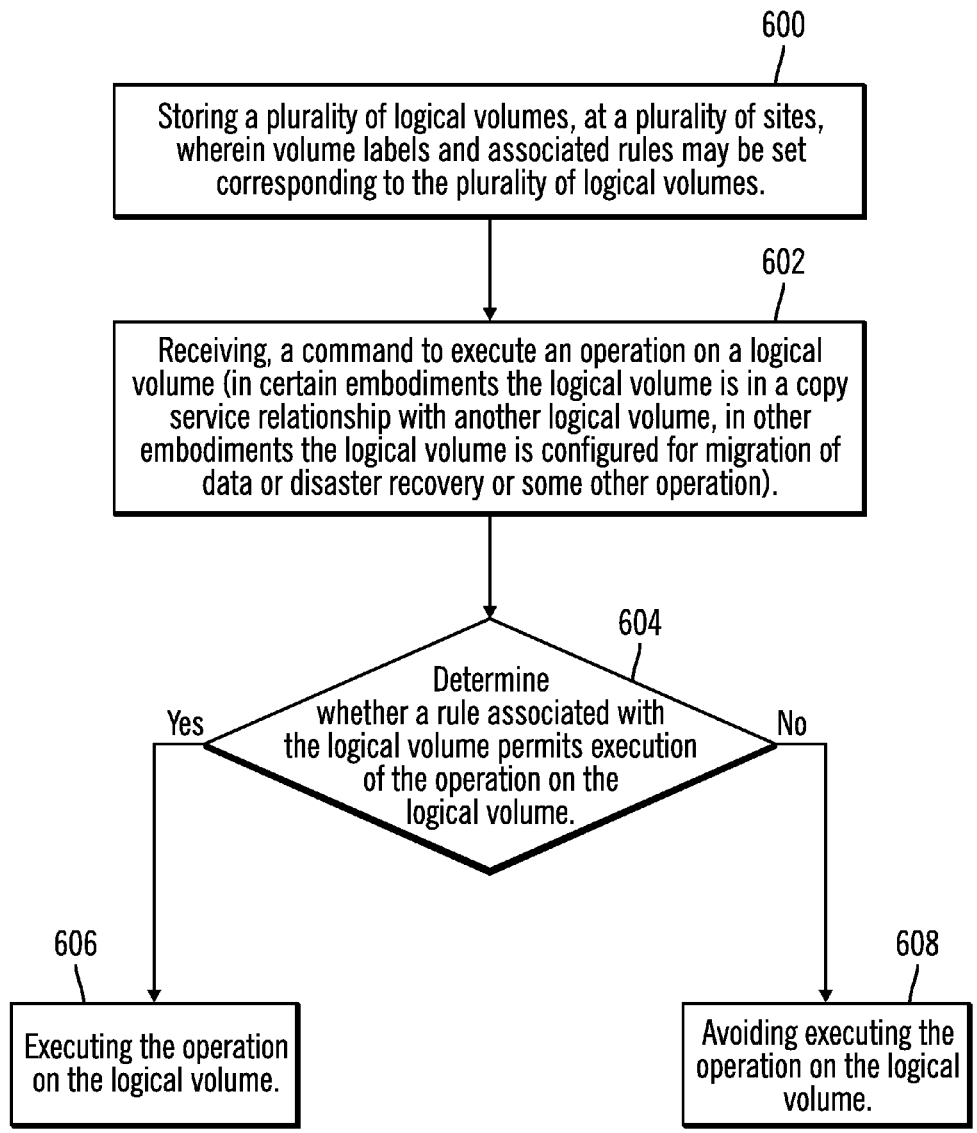
FIG. 6 illustrates a flowchart that shows first operations performed in the computing environment, in accordance with certain embodiments.

FIG. 6 illustrates a first set of exemplary operations that may be performed by one or more storage controllers 102a . . . 102n present in the computing environment 100.

Control starts at block 600 in which, a plurality of logical volumes 106a . . . 106p, 108a . . . 108q, 110a . . . 110r are stored at a plurality of sites 104a . . . 104n, wherein in certain embodiments volume labels and associated rules may be set corresponding to the plurality of logical volumes 106a . . . 106p, 108a . . . 108q, 110a . . . 110r. A command 200 to execute an operation on a logical volume 302 is received (at block 602). In certain embodiments, the logical volume 302 is in a copy service relationship with another logical volume. In other embodiments, the logical volume 302 is configured for migration of data or disaster recovery or some other operation. A determination is made (at block 604) as to whether a rule 304 associated with the logical volume 302 permits execution of the operation on the logical volume. In response to determining ("Yes" branch from block 604) that the rule associated with the logical volume permits execution of the operation on the logical volume, the operation is executed (at block 606) on the logical volume. Also, in response to determining that the rule associated with logical volume does not permit execution of the operation on the logical volume ("No" branch from block 604), the execution of the operation on the logical volume is avoided (at block 608).

Therefore, FIG. 6 illustrates certain embodiments in which rules associated with a logical volume restrict operations that may be performed on the logical volume.

Figure 7:
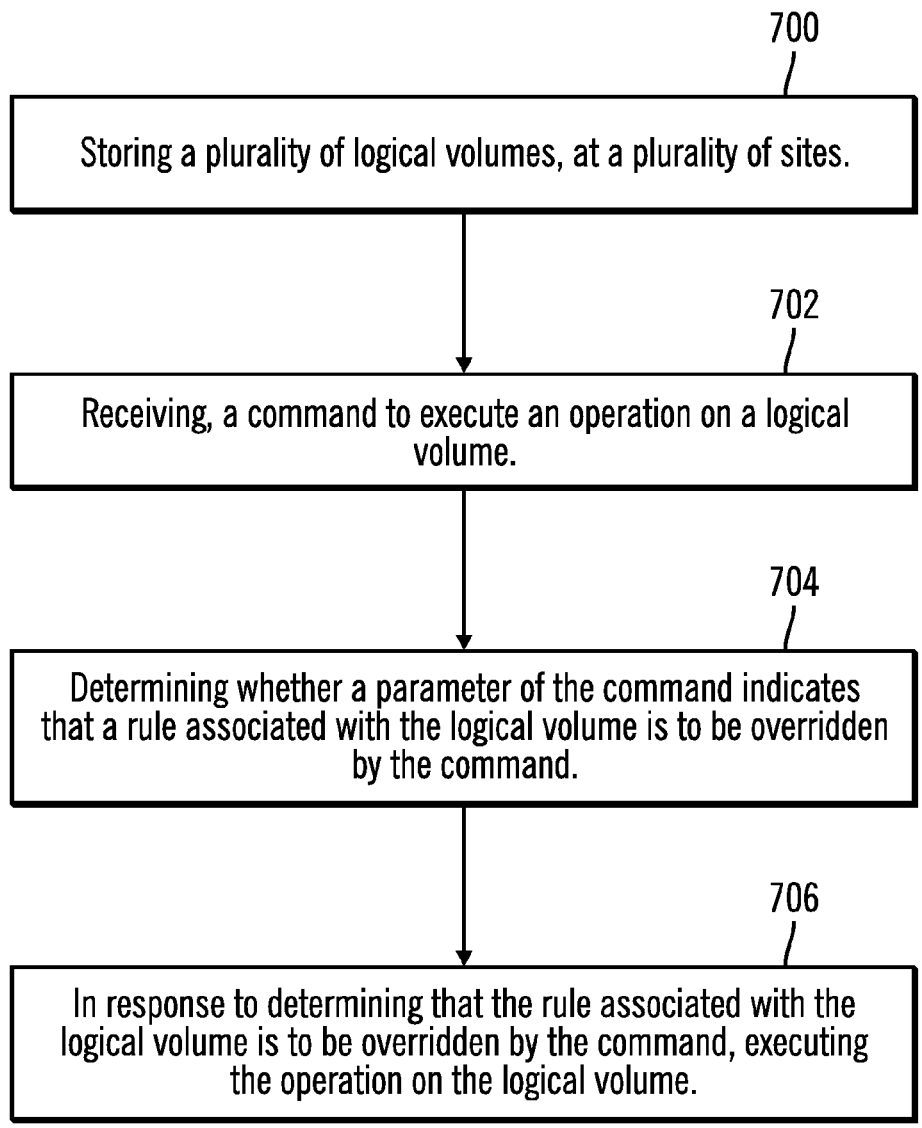
FIG. 7 illustrates a flowchart that shows second operations performed in the computing environment, in accordance with certain embodiments

FIG. 7 illustrates a second set of exemplary operations that may be performed by one or more storage controllers 102a . . . 102n present in the computing environment 100.

Control starts at block 700 in which, a plurality of logical volumes 106a . . . 106p, 108a . . . 108q, 110a . . . 110r are stored at a plurality of sites 104a . . . 104n. A command 200 to execute an operation on a logical volume 302 is received (at block 702).

A determination is made (at block 704) as to whether a parameter 206 of the command indicates that the rule associated with the logical volume is to be overridden by the command. In response to determining that the rule associated with the logical volume is to be overridden by the command, the operation on the logical volume is executed (at block 706).

Therefore, FIG. 7 illustrates certain embodiments in which a logical volume rule override flag's setting may be used to determine whether or not to override a rule associated with a logical volume.

Certain embodiments may provide a mechanism to set volume labels (volume names and/or labels, etc.) and to associate rules with these volume labels. Mechanisms may be provided for a new query to determine a volume's label and associated characteristics. A verbose option may also provide the current copy services relationships for the volume. A bulk option to not just obtain information for a single specific volume but obtain information for all volumes of a particular label in a subsystem may also be provided. In certain additional embodiments, new bits for enforcing or overriding the associated rules during copy services and disaster recovery may be provided. Furthermore, mechanisms for modifying or clearing the volume label and/or rules may also be provided.

In certain embodiments, the volume label may help a user to understand which volumes are being used and copy relationships may be established accordingly. The volume label itself is of value, but because there are so many possible disaster recovery configurations, the meaning of the label and the allowed behavior are also stored. For example, when the label is created for a volume, a mechanism for associating expected behavior and role in disaster recovery algorithms for the volume type are also created and stored in a rules data structure.

In certain embodiments, rule usage and enforcement are performed once logical volume labels and rules are in place. The rule usage and enforcement may also be performed via alternative embodiments in which logical volume labels and rules associated with the logical volume labels are not set and other mechanisms are used for determining the rules. In certain other embodiments, the logical volume labels and rules may be used for other operations besides rule enforcement.

In certain embodiments, the logical volumes may be labeled prior to any copy services relationship being set. In other embodiments, the logical volume labels and associated rules may be used without any copy services relationship being set. In certain embodiments, the logical volume labels and associated rules may be used for data migration or disaster recovery.

In certain embodiments, the logical volumes of interest need not be in any relationship for the enforcement of rules. In certain other embodiments, the rules may prevent a logical volume from being put into a relationship in the first place. For example, in an exemplary embodiment, an exemplary logical volume 0×1000 may have a logical volume label indicating that logical volume 0×1000 is to be used as a point in time copy operation's target. If an establish command is received to make logical volume 0×1000 into a point in time copy operation's source, in certain embodiments the establish command may be rejected.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
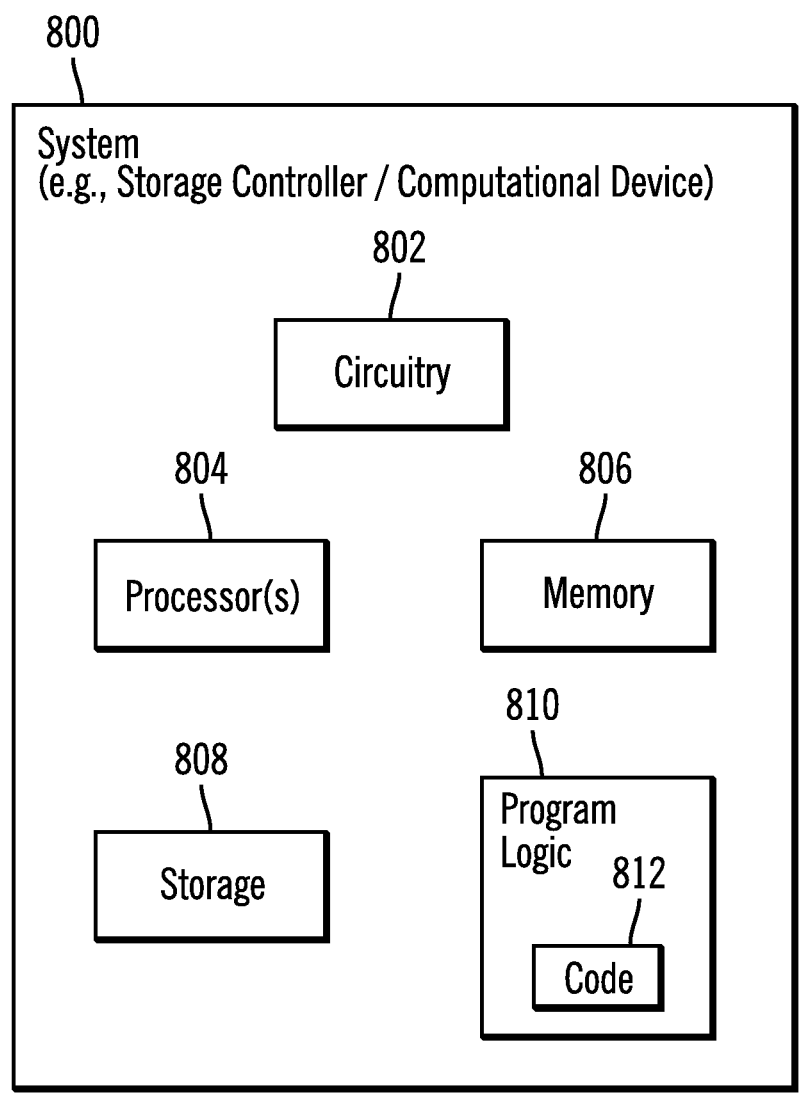
FIG. 8 illustrates a block diagram of a computational system that shows certain elements that may be included in the storage controllers of FIG. 1, in accordance with certain embodiments.

FIG. 8 illustrates a block diagram that shows certain elements that may be included in a system 800 in accordance with certain embodiments. The system 800 may comprise the storage controllers 102a . . . 102n and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

In certain embodiments, the storage controllers 102a . . . 102n may comprise cloud component parts included in a cloud computing environment. In the cloud computing environment the systems architecture of the hardware and software components involved in the delivery of cloud computing may involve a plurality of cloud components communicating with each other.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system comprising:
   a memory; and
   a processor coupled to the memory, wherein the processor performs operations, the operations comprising:
   receiving a point-in-time copy command to execute an operation on a logical volume,
   in response to determining that a logical volume override flag is set to indicate that a rule associated with the logical volume is not to be overridden by the point in time copy command, processing the rule associated with the logical volume to determine whether the operation is to be executed on the logical volume;
   in response to determining that the rule associated with the logical volume permits execution of the operation on the logical volume, executing the operation on the logical volume; and
   in response to determining that the rule associated with logical volume does not permit execution of the operation on the logical volume, avoiding executing the operation on the logical volume.

2. The system of claim 1, the operations further comprising:
   determining whether the logical volume override flag indicates that the rule associated with the logical volume is to be overridden by the point-in-time command.

3. The system of claim 1, wherein:
   the rule associated with the logical volume restricts a copy operation to be performed on the logical volume to overwrite the logical volume if the logical volume stores a consistent copy of another logical volume; and
   a label associated with the logical volume identifies the logical volume.

4. The system of claim 1,
   wherein the logical volume is a first logical volume that is in a consistent copy service relationship with a second logical volume;
   a withdraw command requests withdrawal of at least the first or the second logical volume from the consistent copy service relationship; and
   rejecting the withdraw command, in response to interpreting rules associated with the first or the second logical volume.

5. The system of claim 1, wherein prior to receiving the point-in-time command to execute the operation on the logical volume, performing:
   setting a volume label for the logical volume; and
   associating the rule with the volume label.

6. The system of claim 1, wherein the logical volume is in a copy service relationship with another logical volume.

7. A computer program product, the computer program product comprising:
   a computer readable storage medium having computer readable program code embodied therewith, the computer readable program code configured to perform operations when executed by a processor, the operations comprising:
   receiving a point in time copy command to execute an operation on a logical volume,
   in response to determining that a logical volume override flag is set to indicate that a rule associated with the logical volume is not to be overridden by the point in time copy command, processing the rule associated with the logical volume to determine whether the operation is to be executed on the logical volume;
   in response to determining that the rule associated with the logical volume permits execution of the operation on the logical volume, executing the operation on the logical volume; and
   in response to determining that the rule associated with logical volume does not permit execution of the operation on the logical volume, avoiding executing the operation on the logical volume.

8. The computer program product of claim 7, the operations further comprising:

determining whether a parameter of the command indicates that the rule associated with the logical volume is to be overridden by the command.

9. The computer program product of claim 7, wherein:

the rule associated with the logical volume restricts a copy operation to be performed on the logical volume to overwrite the logical volume if the logical volume stores a consistent copy of another logical volume; and a label associated with the logical volume identifies the logical volume.

10. The computer program product of claim 7, wherein the logical volume is a first logical volume that is in a consistent copy service relationship with a second logical volume;

wherein the command is a withdraw command that requests withdrawal of at least the first or the second logical volume from the consistent copy service relationship; and rejecting the withdraw command, in response to interpreting rules associated with the first or the second logical volume.

11. The computer program product of claim 7, wherein prior to receiving the command to execute the operation on the logical volume, performing:

setting a volume label for the logical volume; and associating the rule with the volume label.

12. The computer program product of claim 7, wherein the logical volume is in a copy service relationship with another logical volume.

13. A storage controller coupled to a plurality of other storage controllers at a plurality of sites, the storage controller comprising:

a memory; and a processor coupled to the memory, wherein the processor performs operations, the operations comprising:

receiving a point in time copy command to execute an operation on a logical volume, in response to determining that a logical volume override flag is set to indicate that a rule associated with the logical volume is not to be overridden by the point in time copy command, processing the rule associated with the logical volume to determine whether the operation is to be executed on the logical volume;

in response to determining that the rule associated with the logical volume permits execution of the operation on the logical volume, executing the operation on the logical volume; and in response to determining that the rule associated with logical volume does not permit execution of the operation on the logical volume, avoiding executing the operation on the logical volume.

14. The storage controller of claim 13, the operations further comprising:

determining whether a parameter of the command indicates that the rule associated with the logical volume is to be overridden by the command.

15. The storage controller of claim 13, wherein:

the rule associated with the logical volume restricts a copy operation to be performed on the logical volume to overwrite the logical volume if the logical volume stores a consistent copy of another logical volume; and a label associated with the logical volume identifies the logical volume.

16. The storage controller of claim 13, wherein the logical volume is a first logical volume that is in a consistent copy service relationship with a second logical volume;

wherein the command is a withdraw command that requests withdrawal of at least the first or the second logical volume from the consistent copy service relationship; and rejecting the withdraw command, in response to interpreting rules associated with the first or the second logical volume.

17. The storage controller of claim 13, wherein prior to receiving the command to execute the operation on the logical volume, performing:

setting a volume label for the logical volume; and associating the rule with the volume label.

18. The storage controller of claim 13, wherein the logical volume is in a copy service relationship with another logical volume.

* * * * *